Feb. 27, 1945.  W. J. JACOBSSON ET AL  2,370,245
NEEDLE VALVE
Filed Sept. 11, 1942
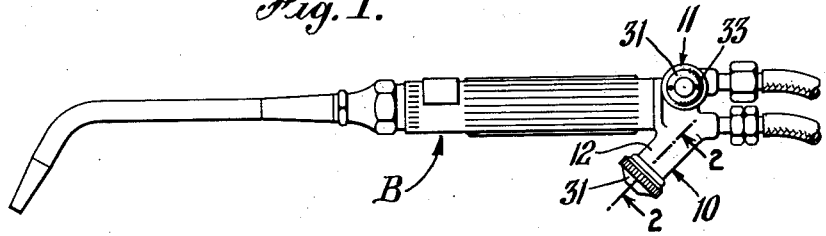
Fig. 1.
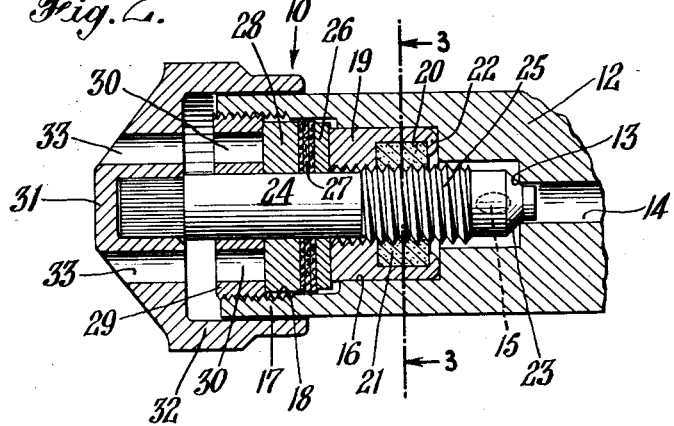
Fig. 2.
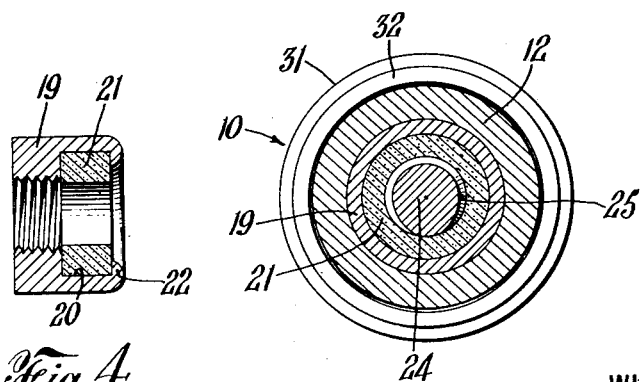
Fig. 3.
Fig. 4.
INVENTORS
WILGOT J. JACOBSSON
CLIFFORD C. ANTHES
BY
ATTORNEY Patented Feb. 27, 1945

2,370,245

UNITED STATES PATENT OFFICE 2,370,245

NEEDLE VALVE

Wilgot J. Jacobsson, Plainfield, and Clifford C. Anthes, Union, N. J., assignors to Union Carbide and Carbon Corporation, a corporation of New York Application September 11, 1942, Serial No. 457,946

7 Claims. (Cl. 251—50)

This invention relates to needle valves and more particularly to blowpipe needle valves which are adjustable for accurately controlling the flow of gases such as acetylene and oxygen in the blowpipe.

Heretofore, the needle valves used in welding and cutting blowpipes as well as in numerous other devices have a common fault of undesirable backlash which is caused by a slight clearance in the threaded connection between the valve stem and the valve body. The conventional packing, although pressed against the stem, still allows the stem to move between play limits if the valve is jarred or the stem is subjected to force. This is very undesirable in blowpipe needle valves, because it causes the oxygen-acetylene ratio to change after adjustment.

Therefore, the main object of the present invention is to eliminate such backlash. Another object of the invention is to provide a needle valve of improved construction, which is gas tight and not subject to leakage. A further object is to provide a novel valve assembly in which backlash is prevented.

Generally speaking, the foregoing objects are accomplished by introducing a plastic insert or ring in a threaded metal bushing which is pressed into the valve body. Such plastic insert may be either threaded undersize or not threaded at all, depending upon the nature of the plastic used for the insert. The valve stem, when screwed into the bushing, makes its own thread in the plastic insert, resulting in a no-play condition. The thread in the metal bushing prevents stripping of the thread of the plastic insert.

Referring to the drawing:

Fig. 1 is a view in side elevation of a welding blowpipe having a needle valve assembly exemplifying the invention;

Fig. 2 is an enlarged cross-sectional view of the needle valve assembly taken on line 2—2 of Fig. 1;

Fig. 3 is a sectional view taken on line 3—3 of Fig. 2, and

Fig. 4 is a view in section of the bushing and insert unit before use.

Except for its needle valve assemblies 10 and 11, the blowpipe B may be of conventional construction which is well known to those skilled in the art. The needle valve assembly 10 is adapted to control the flow of one gas such as acetylene delivered to the blowpipe B, while the needle valve assembly 11 is adapted to control the flow of another gas such as oxygen to the blowpipe.

The valve assemblies 10 and 11 are similar in construction. The valve assembly 10, for example, includes a body 12 having an annular valve seat 13 between a fluid inlet passage 14 and a fluid outlet passage 15. The body is also provided with a cavity 16 and a cylindrical flange 17 provided with an internally threaded portion 18. An internally threaded member 19 in the form of a metal bushing is non-rotatably disposed within the cavity 16 and associated thereby with the valve body 12. The bushing 19 is provided with an internal annular recess 20 adjacent one end within which is disposed an insert member 21 of plastic or non-metallic material in the form of a ring which completely fills the annular recess 20. The plastic ring 21 is secured in place within the recess 20 by an inturned annular flange 22 of the bushing 19. The plastic ring 21 is preferably made of polyvinylidene chloride such as polymers and conjoint polymers of vinylidene chloride and vinyl chloride. Such materials, hereinafter referred to as vinylidene chloride plastics, have advantageous characteristics, such as resilience, negligible moisture absorption, and good resistance to cold flow and oxidation, which render them ideal for such use according to the present invention.

The needle valve element 23 itself consists of a metal stem 24 having an externally threaded portion 25 fitting the internally threaded member 19 by means of which the valve 23 may be adjusted with respect to the seat 13 to control the flow of fluid from the inlet 14 to the outlet 15. The externally threaded portion 25 of the stem 24 extends through and is frictionally engaged by the plastic ring 21 to prevent any backlash between the valve stem 24 and the internally threaded member 19. The stem 24 is preferably screwed into the internally threaded metal member 19 and the plastic ring 21, the internal surface of which may be initially unthreaded or only partially threaded, so that the externally threaded portion 25 of the stem threads the internal surface of the ring 21 and is frictionally engaged thereby.

The bushing 19 is preferably knurled on its outer surface and is pressed into cavity 16 to prevent the bushing 19 from turning in cavity 16. After the bushing 19 is inserted within the cavity 16, a metal washer 26 is seated on the bushing 19, packing material 27 is disposed around the stem 24 on the washer 26 within the cavity and a second metal washer 28 is disposed in engagement with the packing material 27. The packing material 27 is compressed through the washer

28 by an annular screw 29 which engages the internally threaded portion 18 of the flange 17 of the body 12. The screw 29 is provided with diametrically disposed tool-receiving recesses 30, 30 extending therethrough.

For exceptionally good sealing conditions the packing material 27 preferably consists of a combination of washers of leather containing a lubricant, and of plastic, since the latter, when used alone, has a tendency to back off slightly after the valve has been set. Thus, no change in the valve setting is possible even under extreme jarring conditions.

A handwheel 31 is secured to the outer end of the valve stem 24 so that the opening of the valve 23 may be adjusted by manually turning the handwheel 31. The handwheel 31 preferably comprises a cap having an annular skirt 32 overlapping and bearing against the annular flange 17 of the body 12. The cap 31 is provided with diametrically disposed holes 33, 33 which are adapted to be registered with the recesses 30, 30 in the annular screw 29. Thus, the screw 29 may be turned to tighten the packing 27 without removing the combined handwheel and cap 31.

The valve assembly of the present invention has the advantage of not having any outside threads on the body 12, and the packing screw 29 is protected by the cap 31 which is guided on the body flange 17 within which the valve stem 24 is disposed. Thus, the present valve construction is such that it cannot be damaged readily so as to become inoperative. Another advantage resides in the fact that the bushing 19 may be readily replaced if damaged or worn, thereby saving the entire unit in which the valve is used. Ordinary type valves in use before the present invention lack this advantage.

What is claimed is:

1. A blowpipe needle valve assembly comprising, in combination, a body having an annular valve seat between fluid inlet and outlet passages, said body also having a cavity and cylindrical flange provided with an internally threaded portion, an internally threaded member disposed within said cavity, said member having an internal annular recess adjacent to one end, a plastic ring filling said annular recess, a needle valve having a stem provided with an externally threaded portion fitting said internally threaded member for adjusting said valve with respect to said seat, the externally threaded portion of said stem extending through and being frictionally engaged by said plastic ring to prevent any backlash between said valve stem and said internally threaded member, a first metal washer seated on said member, packing material comprising plastic and lubricated leather washers surrounding said stem on said metal washer within said cavity, a second metal washer engaging said packing material, an annular screw engaging the internally threaded portion of said body for compressing said packing material through said second metal washer, said screw having diametrically disposed tool receiving recesses, and a handwheel secured to the outer end of said valve stem, said handwheel comprising a cap having an annular skirt overlapping and bearing against said flange, said cap also having diametrically disposed holes adapted to register with the recesses in said screw.

2. A blowpipe needle valve assembly comprising, in combination, a body having an annular valve seat between fluid inlet and outlet passages, said body also having a cavity and a cylindrical flange provided with an internally threaded portion, an internally threaded member disposed within said cavity, said member having an internal annular recess adjacent one end, a plastic ring filling said annular recess, a needle valve having a stem provided with an externally threaded portion fitting said internally threaded member for adjusting said valve with respect to said seat, the externally threaded portion of said stem extending through and being frictionally engaged by said plastic ring to prevent any backlash between said valve stem and said internally threaded member, a first washer seated on said member, packing material surrounding said stem on said washer within said cavity, a second washer engaging said packing material, and an annular screw engaging the internally threaded portion of said body for compressing said packing material through said second washer.

3. In a valve assembly, a valve body, a rotatable valve element operable within the valve body, packing material for sealing off leakage flow of fluid tending to creep along the valve element means for securing the packing material within the body, means in the valve body having metal to metal contact with the valve element to cause its axial displacement with respect to the valve body when the valve element is rotated, and means comprising a member composed of plastic independent of both the packing material and the metal to metal contact means, and frictionally engaging the valve element for inhibiting backlash between the metal to metal means and the valve element.

4. In a valve assembly, a valve body having a cavity therein, an internally threaded bushing removably secured to the body within the cavity thereof, a rotatable valve element axially adjustable through the threaded bushing, packing material within the cavity for sealing off leakage flow of fluid tending to creep along the valve element, means for securing the packing material within the cavity, said removable threaded bushing having a non-metallic ring within itself also threadingly engageable with the valve element for preventing backlash of the valve element with respect to the bushing and the valve body, said non-metallic ring thereby being independent of the packing material and being removable from the valve body with the threaded bushing.

5. In a valve assembly, a valve body having a cavity provided with a fluid inlet and a fluid outlet, and a valve seat between said inlet and said outlet; a rotatable and axially movable valve element having an externally threaded portion and a part movable against and away from said seat; and means in said cavity cooperating with said threaded portion both to axially move said element when the latter is rotated and to substantially eliminate axial play of said element in all positions of the latter, said means comprising a non-rotatable metal bushing having an internal thread fitting said threaded portion, and a non-metallic ring secured to said bushing and having an internal thread frictionally engaging said threaded portion.

6. In a valve assembly, a valve body having a cavity provided with a fluid inlet and a fluid outlet, and a valve seat between said inlet and said outlet; a rotatable and axially movable valve element having an externally threaded portion and a part movable against and away from said seat; and means in said cavity cooperating with said threaded portion both to axially move said element when the latter is rotated and to substantially eliminate axial play of said element in all positions of the latter, said means comprising a non-rotatable metal bushing having an internal thread fitting said threaded portion, and a non-metallic ring secured to said bushing between the valve seat and the internal thread of the metal bushing, said non-metallic ring having an internal thread frictionally engaging said threaded portion.

7. In a valve assembly, a valve body having a fluid inlet and a fluid outlet, a rotatable and axially movable valve element for controlling the flow of fluid between said inlet and said outlet, such valve element having a threaded portion, and means associated with the valve body and cooperating with said threaded portion both to axially move said element when the latter is rotated and to substantially eliminate axial play of said element in all positions of the latter, said means comprising a non-rotatable member having a thread fitting said threaded portion and a non-metallic member having a thread frictionally engaging said threaded portion of the valve element said non-rotatable member having a recess within which said non-metallic member is disposed so as to completely fill such recess.

WILGOT J. JACOBSSON.
CLIFFORD C. ANTHES.